(12) United States Patent
Thomson et al.

(10) Patent No.: US 9,307,186 B2
(45) Date of Patent: Apr. 5, 2016

(54) CONVERSION OF VIDEO FRAME RATE

(71) Applicant: Amberfin Limited, Basingstoke (GB)

(72) Inventors: Roderick MacKenzie Thomson, Nelson (NZ); Bruce Devlin, Chiddingfold (GB); Timothy Ian Shuttleworth, Reading (GB)

(73) Assignee: Amberfin Limited, Basingstoke (GB)

( * ) Notice: Subject to any disclaimer, the term of this patent is extended or adjusted under 35 U.S.C. 154(b) by 0 days.

(21) Appl. No.: 14/472,497

(22) Filed: Aug. 29, 2014

(65) Prior Publication Data
US 2015/0062427 A1 Mar. 5, 2015

(30) Foreign Application Priority Data
Aug. 30, 2013 (GB) .................................. 1315531.2

(51) Int. Cl.
*H04N 7/01* (2006.01)
(52) U.S. Cl.
CPC .................................. *H04N 7/0127* (2013.01)
(58) Field of Classification Search
CPC .................................................. H04N 13/0051
USPC ........................... 348/459, 441, 443, 445, 458
See application file for complete search history.

(56) References Cited

U.S. PATENT DOCUMENTS

| | | | | |
|---|---|---|---|---|
| 4,890,160 A * | 12/1989 | Thomas | .................. | G06T 7/206 348/429.1 |
| 6,452,639 B1 * | 9/2002 | Wagner | ..................... | G09G 5/00 348/441 |
| 6,480,232 B1 * | 11/2002 | Wilson | ..................... | H04N 7/01 348/459 |
| 8,810,726 B2 * | 8/2014 | Diggins | .................. | H04N 7/01 345/534 |
| 2005/0117775 A1 * | 6/2005 | Wendt | ..................... | G06T 1/005 382/100 |
| 2005/0185819 A1 * | 8/2005 | Delp | ..................... | G06T 1/0028 382/100 |
| 2008/0144725 A1 * | 6/2008 | Henocq | .................. | H04N 5/765 375/240.27 |
| 2008/0192060 A1 * | 8/2008 | Ogiso | ........................ | G06F 3/14 345/546 |
| 2010/0231593 A1 * | 9/2010 | Zhou | ..................... | G06T 3/4007 345/428 |

\* cited by examiner

*Primary Examiner* — Paulos M Natnael
(74) *Attorney, Agent, or Firm* — Bardmesser Law Group

(57) ABSTRACT

A video frame rate converter has a temporal synchronization analyzer for dividing the input video sequence into successive groups of frames each of $N_{in}$ consecutive frames and a motion analyzer for analyzing motion over the frames of each group to provide a group motion measure. The inverter includes both an interpolator for performing interpolation on a group of $N_{in}$ input frames to provide $N_{out}$ output frames, where $N_{in}$ is different from $N_{out}$; and a synchronizer for deleting or repeating an identified frame from the group of $N_{in}$ input frames to provide $N_{out}$ output frames. A switcher then switches group-by-group in dependence upon the group motion measure between the interpolator and the synchronizer to form an output video sequence having an output frame rate different from the input frame rate.

16 Claims, 2 Drawing Sheets

CONVERSION OF VIDEO FRAME RATE

CROSS-REFERENCE TO RELATED APPLICATIONS

This application claims priority to GB 1315531.2, filed on Aug. 30, 2013, incorporated herein by reference in its entirety.

BACKGROUND OF THE INVENTION

1. Field of the Invention

The present invention relates to conversion of the frame rate of video material.

2. Description of the Related Art

In conversion of frame rate the simplest method is to drop frames if converting to a lower frame rate or repeat frames if converting a higher frame rate. This is referred to as the synchronization method. In many applications, the synchronization method has been superseded by interpolation methods as these avoid the obvious jumps in presented content where frames are dropped or repeated where images are moving. Interpolation is typically motion-compensated interpolation to overcome the problem of smearing on moving images.

The motion-compensated interpolation method works well for the majority of material but has difficulty with blurry fast moving images often found with material originated at the filmic frame rates of 24 or 25 fps. In this type of material simple vector fields are not able to map one image onto the next and as a result interpolation artefacts are often visible. It is also the case that, because of the relatively small difference between the frame rates of 24 and 25 fps, the synchronization method requires frames to be dropped or repeated relatively infrequently. One useful approach is therefor to combine the synchronization and interpolation methods, essentially using at any one time the method that produces the better result. An issue which has to be resolved is delay. The interpolation method will be expected to have a fixed delay, while it is of the nature of synchronization that the delay is variable. It is accordingly not possible to switch arbitrarily between the two methods.

Reference is directed to WO 2011/073693 for an arrangement which combines synchronization and interpolation methods, with the issue of delay being resolved through careful control of the two methods. However, it would be advantageous if synchronization and interpolation methods could be combined in a way which required no or minimal control of the individual methods and, particularly, of the interpolation method. This would enable a choice to be made of different interpolation technologies, some of which may not offer external control over timing and delay.

SUMMARY OF THE INVENTION

Accordingly, the present invention consists in one aspect in a method of converting the frame rate of a video sequence in a video processor, comprising the steps of receiving an input video sequence having an input frame rate; dividing the input video sequence into successive groups each of $N_{in}$ consecutive frames; analysing motion over the frames of each group to provide a group motion measure; selecting in accordance with the group motion measure between an interpolation mode and a synchronisation mode to be used with the group of frames; where the interpolation mode is selected, performing interpolation on the group to provide $N_{out}$ output frames, where $N_{in}$ is different from $N_{out}$; where the synchronisation mode is selected, identifying from the group a frame to be deleted or repeated to provide $N_{out}$ output frames; assembling the groups of frames to form an output video sequence having an output frame rate different from the input frame rate.

Advantageously, there is a cycle in the spacing between an input frame position and the output frame position which is closest in time to that input frame position, the cycle being defined by the ratio between the input frame rate and the output frame rate, and in the step of dividing the input video sequence into successive groups, each group boundary is positioned at an input frame position which has a spacing from the closest output frame position which is less than a predetermined spacing threshold. Suitably the predetermined spacing threshold is one half of the difference between the input spacing (between one input frame position and the next input frame position) and the output spacing (between one output frame position and the next output frame position).

The step of analysing motion over the frames of each group may serve in the synchronisation mode to select a frame to be deleted or repeated.

Each group of $N_{out}$ output frames may occupy the same time interval T in the output video sequence, irrespective of whether the interpolation mode or the synchronisation mode is selected for the corresponding group of $N_{in}$ input frames.

The interpolation is usually motion compensated.

In another aspect, the present invention consists in apparatus for converting the frame rate of a video sequence, comprising a temporal synchronisation analyser for dividing the input video sequence into successive groups each of $N_{in}$ consecutive frames; a motion analyser for analysing motion over the frames of each group to provide a group motion measure; an interpolator for performing interpolation on a group of Nin input frames to provide $N_{out}$ output frames, where $N_{in}$ is different from $N_{out}$; a synchroniser for deleting or repeating an identified frame from the group of $N_{in}$ input frames to provide $N_{out}$ output frames; and a switcher configured to switch group-by-group in dependence upon the group motion measure between the interpolator and the synchroniser to form an output video sequence having an output frame rate different from the input frame rate.

Advantageously there is a cycle in the spacing between an input frame position and the output frame position which is closest in time to that input frame position, the cycle being defined by the ratio between the input frame rate and the output frame rate, and the temporal synchronisation analyser is configured to divide the input video sequence into successive groups with each group boundary being positioned at an input frame position which has a spacing from the closest output frame position which is less than a predetermined spacing threshold. Preferably, the predetermined spacing threshold is one half of the difference between the input spacing (between one input frame position and the next input frame position) and the output spacing (between one output frame position and the next output frame position).

The motion analyser may serve to identify a frame to be deleted or repeated in the synchroniser.

Each group of $N_{out}$ output frames may occupy the same time interval T in the output video sequence, irrespective of whether the interpolation mode or the synchronisation mode is selected for the corresponding group of $N_{in}$ input frames.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The present inventors have recognized that while it is not possible to switch arbitrarily between synchronisation and interpolation, there is a repeated cycle of frames where the two methods have the same delay. These frames can be identified and used to partition the input sequence into groups of frames to be processed. The size of the group of frames is dependent on the ratio of the input and output frame rates, but for 24<>25 conversion the group of frames is typically around 24 frames.

The first output frame of each processed group is co-timed (or very nearly) with an input frame and so it is safe to switch between methods at this frame as they will both be producing a copy (or near copy) of an input frame. The output frame position will not line up perfectly with an input frame if either the input or output frame rate is a non-integer value, such as the standard film frame rate of 23.997.

It is then necessary to identify the next anchor frame when the output frame will have a temporal position which is co-timed (or nearly) with an input frame. If an output does not perfectly align with an input frame then we will be searching to find the frame when a minimum in time between the output frame temporal position and an input frame temporal position occurs. When this anchor frame has been identified then the group of frames from the current frame to the next anchor frame will be processed. The motion profile, correlation and frame differences are analysed for the group of frames to decide which conversion, method would be best used for this group. This selected method is then used to generate the output frames up to and including the next anchor frame.

Reference will now be in more detail to the drawings.

Figure 1:
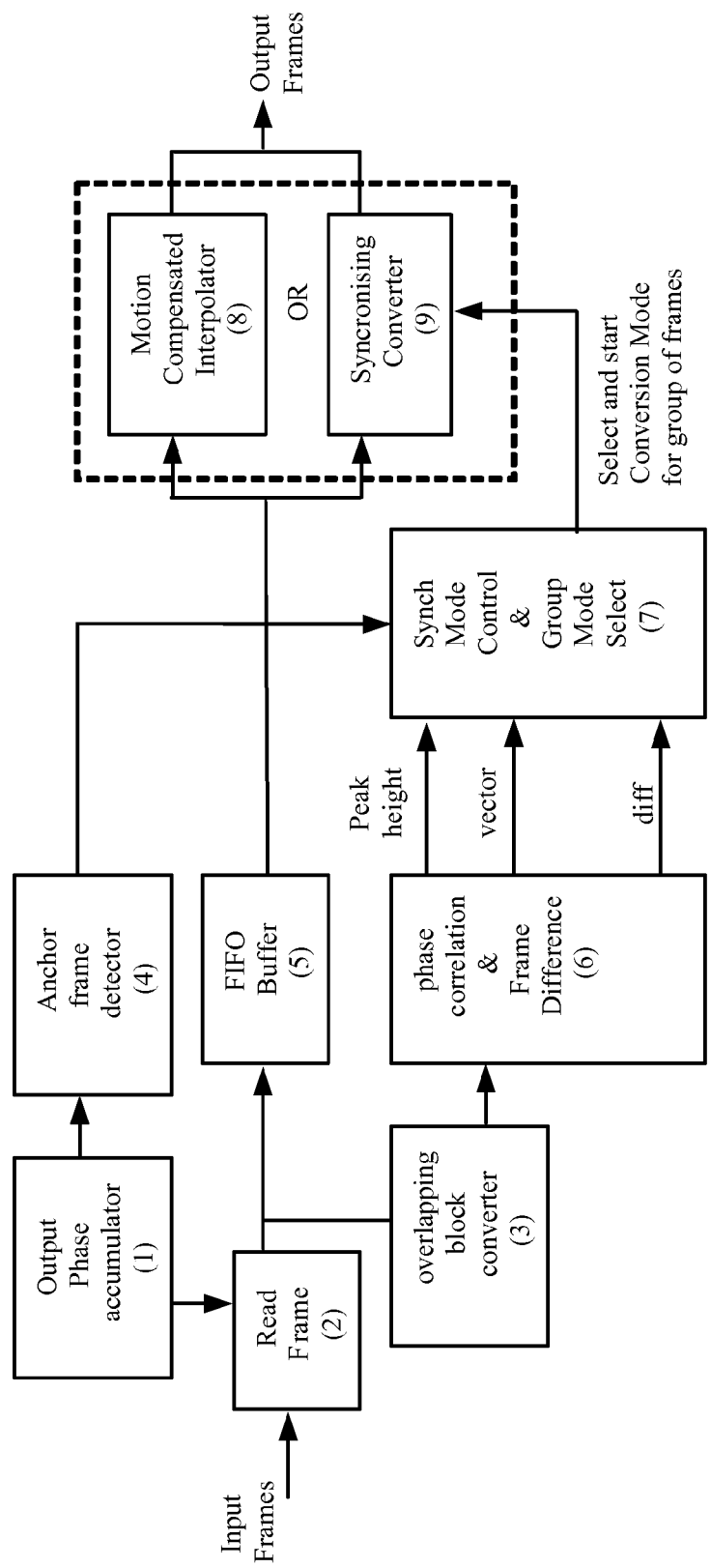
FIG. 1 shows a block diagram of the invention.

FIG. 1 is a block diagram of one embodiment the invention. This embodiment is implemented in software but it could also be in electronic hardware or a combination of both. This embodiment uses the phase correlation approach to motion measurement, as shown originally in U.S. Pat. No. 4,890,160, which is hereby incorporated by reference.

Input frames are received by a read frame block (2) which operates under the control of an output phase accumulator block (1) which also provides an input to the anchor frame detector (4). Frames from the read frame block (2) pass to an overlapping block converter (3) and to a FIFO buffer (5).

Overlapping blocks from converter (3) pass to a phase correlation and frame difference block (6) which in the well-known manner provides for every pair of corresponding blocks: a motion vector, the height of the peak in the phase correlation surface corresponding to that vector and a measure of the difference between the blocks. These three measures are used by synch mode control and group mode select block (7) to control a motion compensated interpolator (8) and a synchronizing converter (9) which are connected in parallel to receive input frames from the FIFO (5) and to deliver output frames.

At the start of processing a new group of frames (GOF) the output phase accumulator (1) is incremented until a new anchor frame is identified. Every time the output phase is incremented a test will identify when a new input frame is required, for example when the incremented output phase exceeds unity. If so an input frame is read and passed through the overlapping block converter (3) to the phase correlation & frame difference processor (6) and a copy of the frame is written into the FIFO buffer (5). The results of the analysis (Peak Height, Vector and Difference) are stored for all the frames in the group. When the anchor frame is identified, the total number of input frames and output frames in the group have been counted. The Control Block (7) now processes all the information from the analysis of all the frames in the group, to identify the position of the frame to drop or repeat if synch mode is selected and also which conversion mode (interpolation or synchronisation) is to be used for this group of frames. Finally the selected conversion is started to do the conversion of this group of frames—reading the frames from the FIFO buffer as required. Once this has been completed the system starts looking for the next anchor frame again.

Figure 2:
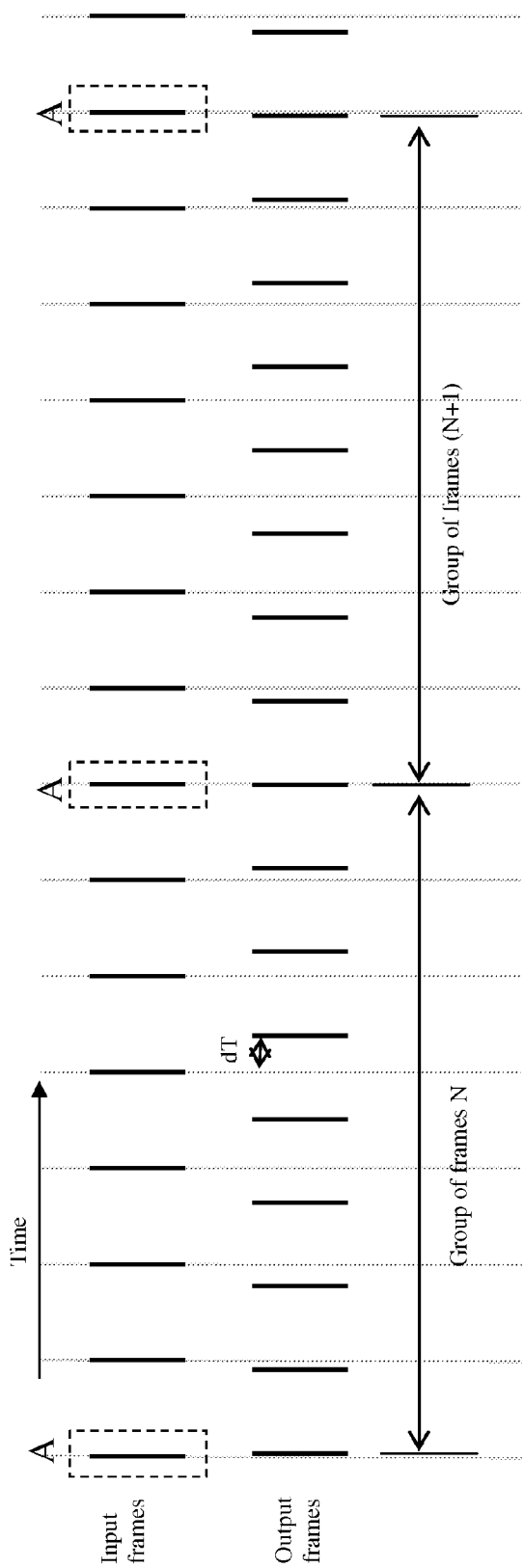
FIG. 2 shows a timing diagram of input and output frames and position of anchor frames and groups of frames to be processed.

FIG. 2 shows a timing diagram of input and output frames against time. In this example the output frame rate is approx 15% higher than the input frame rate, but the invention is not limited to this input/output frame ratio and the output frame rate may of course be lower than the input frame rate. Groups of frames are identified for processing, by identifying the anchor frames, marked in this example with the letter A. The anchor frames are identified by measuring the temporal offset dT for each output frame with respect to the nearest input frame. An anchor frame is defined as whenever the dT value is less than or equal to the value dMin. dMin is calculated as half of the absolute difference between the input and output frame period.

More details will now be given of the phase correlation and frame difference block (6). Each input frame is resampled, in this embodiment, into overlapping blocks. arranged in either a 10×8 array for 4:3 input frames and 14×8 array for 16×9 input frames. The blocks are 100% overlapping so the edge of one block reaches the centre of the adjacent blocks on all sides. The phase correlation is calculated between each block and the corresponding block in the same spatial position in the previous frame. The resulting correlation surface is searched to find the maximum value. This value is referred to as the peak height pkH and is stored for each block. The position of this maximum value (vecx and vecy) represents the movement between the previous frame and the current (for the measured block) and is stored for each block in the form of a vector. The accumulated absolute frame difference absD is also calculated for each block.

To enable a decision to be made on whether to interpolate or to synchronize, an interpolation score (IntScore) and a synchronisation score (synScore) are generated. The IntScore for the group of pictures is compared with the syncScore to select the conversion method for the group of pictures. If the Intscore is greater the Interpolation method is chosen else the syncroniser method is selected.

IntScore is generated by the following steps.

1. pkScore=function of pkH. It takes the form of pkScore=pkGain*pkH. And is clipped to a maximum of 100.

2. diffScore=function of absD (generated as an inverse function in a look up table takes the form of diffScore=100−diffGain*absDiff .value is clipped to at a minimum value of 0.

3. vecScore=function of the absolute difference between vector and vectors from adjacent blocks. It takes the form of vecScore=100−vecGain*vecDiffSum, where vecDiffSum is the sum of the absolute difference between the vector for the current block and the vector of the four adjacent blocks. The IntScore is the maximum (pkScore, diffScore, vecScore).

The syncScore is generated as follows. TotalAbsDiff is calculated by adding together all of the absDiff for all the blocks in the frame. The max value is found for the group of frames. The processing group of these TotalAbsDiff values are searched to find the biggest relative change compared. Each value is compared with the value from the previous frame and the next frame. Rf=TotalAbsDiff(n)/TotalAbsDiff(n+1) and Rb=TotalAbsDiff(n)/TotalAbsDiff(n−1) Max value for Rf and Rb is selected for the group of frames and this is used to generate the sync score. syncScore=syncGain*max(Rf,Rb). The position of this frame is also recorded as the position that sync mode would use to drop a frame.

It is of course a simple matter to select appropriate gain values for any particular set up using routine trial and experiment. Other variations in the manner in which the scores are calculated will be apparent to the skilled reader. The comparison of two scores is of course only one variant. In another approaches a single score or measure can be compared with a fixed threshold.

It should be understood that this invention has been described by way of example only and that a wide variety of modifications are possible without departing from the scope of the appended claims. Thus a wide variety of group motion measures can be used beyond the interpolation and synchronisation scores of the described embodiment. While phase correlation is an effective technique for measuring motion, the skilled man will recognise that a variety of alternative techniques exist, including block matching and gradient techniques. The peak height measure may not apply to other motion measurement techniques. It may be dispensed with or an alternative measure derived of the estimated accuracy of the vectors.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. An apparatus for receiving an input video sequence having an input frame rate and forming an output video sequence having an output frame rate different from an input frame rate, the apparatus comprising:
   a temporal synchronisation analyser for dividing the input video sequence into successive groups of frames, each group of frames containing $N_{in}$ consecutive frames;
   a motion analyser for analysing motion over the frames of each group of frames to provide a group motion measure representing motion within each respective group of frames;
   an interpolator for performing interpolation on a group of $N_{in}$ input frames to provide $N_{out}$ output frames, where $N_{in}$ is different from $N_{out}$;
   a synchroniser for deleting or repeating an identified frame from the group of $N_{in}$ input frames to provide $N_{out}$ output frames; and
   a switcher configured to switch group-by-group, depending upon a motion measure of the corresponding group of frames, between the interpolator and the synchroniser to form an output video sequence having the output frame rate different from the input frame rate,
   wherein in the apparatus there is a cycle in a spacing between an input frame position and the output frame position closest in time to that input frame position, the cycle being defined by a ratio between the input frame rate and the output frame rate,
   wherein the temporal synchronisation analyser is configured to divide the input video sequence into successive groups of frames, with each group boundary being positioned at an input frame position that has a spacing from the closest output frame position less than a predetermined spacing threshold.

2. The apparatus of claim 1, in which the predetermined spacing threshold is one half of a difference between an input spacing (between one input frame position and the next input frame position) and an output spacing (between one output frame position and the next output frame position).

3. The apparatus of claim 1, where the motion analyser identifies a frame to be deleted or repeated in the synchroniser.

4. The apparatus of claim 1, wherein the interpolator is motion compensated.

5. The apparatus of claim 1, in which
   each group of $N_{out}$ output frames occupies the same time interval T in the output video sequence, irrespective of whether the interpolation mode or the synchronisation mode is selected for the corresponding group of $N_{in}$ input frames.

6. The apparatus of claim 5, in which the predetermined spacing threshold is one half of the difference between an input spacing (between one input frame position and the next input frame position) and an output spacing (between one output frame position and the next output frame position).

7. A method of converting the frame rate of a video sequence in a video processor, comprising the steps of:
   receiving an input video sequence having an input frame rate;
   dividing the input video sequence into successive groups of frames, each group of frames containing $N_{in}$ consecutive frames;
   analysing motion over the frames of each group to provide a group motion measure;
   selecting an interpolation mode and a synchronisation mode to be used with the group of frames, based on a group motion measure of the corresponding group of frames;
   where the interpolation mode is selected, performing interpolation on the group to provide $N_{out}$ output frames, where $N_{in}$ is different from $N_{out}$;
   where the synchronisation mode is selected, identifying from the group a frame to be deleted or repeated to provide $N_{out}$ output frames; and
   assembling the groups of frames to form an output video sequence having an output frame rate different from the input frame rate,
   wherein there is a cycle in the spacing between an input frame position and an output frame position closest in time to that input frame position, the cycle being defined by a ratio between the input frame rate and the output frame rate, where, in the step of dividing the input video sequence into successive groups of frames, each group boundary is positioned at an input frame position which has a spacing from the closest output frame position less than a predetermined spacing threshold.

8. The method of claim 7, in which the predetermined spacing threshold is one half of a difference between an input spacing (between one input frame position and the next input frame position) and an output spacing (between one output frame position and the next output frame position).

9. The method of claim 7, where the step of analysing motion over the frames of each group selects a frame to be deleted or repeated in the synchronisation mode.

10. The method of claim 7, wherein each group of $N_{out}$ output frames occupies the same time interval T in the output video sequence, irrespective of whether the interpolation mode or the synchronisation mode is selected for the corresponding group of $N_{in}$ input frames.

11. The method of claim 7, wherein the interpolation is motion compensated.

12. A non-transitory computer program product comprising instructions to perform a method comprising the steps of:
  receiving an input video sequence having an input frame rate;
  dividing the input video sequence into successive groups of frames, each group of frames containing $N_{in}$ consecutive frames;
  analysing motion over the frames of each group to provide a group motion measure;
  selecting an interpolation mode and a synchronisation mode to be used with the group of frames, based on a group motion measure of the corresponding group of frames;
  where the interpolation mode is selected, performing interpolation on the group to provide $N_{out}$ output frames, where $N_{in}$ is different from $N_{out}$;
  where the synchronisation mode is selected, identifying from the group a frame to be deleted or repeated to provide $N_{out}$ output frames; and
  assembling the groups of frames to form an output video sequence having an output frame rate different from the input frame rate,
  wherein there is a cycle in the spacing between an input frame position and an output frame position closest in time to that input frame position, the cycle being defined by a ratio between the input frame rate and the output frame rate, where, in the step of dividing the input video sequence into successive groups of frames, each group boundary is positioned at an input frame position which has a spacing from the closest output frame position less than a predetermined spacing threshold.

13. The computer program product of claim 12, in which a predetermined spacing threshold is one half of a difference between an input spacing (between one input frame position and the next input frame position) and an output spacing (between one output frame position and the next output frame position).

14. The computer program product of claim 12, where the step of analysing motion over the frames of each group selects a frame to be deleted or repeated in the synchronisation mode.

15. The computer program product of claim 12, wherein each group of $N_{out}$ output frames occupies the same time interval T in the output video sequence, irrespective of whether the interpolation mode or the synchronisation mode is selected for the corresponding group of $N_{in}$ input frames.

16. The computer program product of claim 12, in which
  the predetermined spacing threshold is one half of a difference between the input spacing (between one input frame position and the next input frame position) and an output spacing (between one output frame position and the next output frame position); and
  each group of $N_{out}$ output frames occupies the same time interval T in the output video sequence, irrespective of whether the interpolation mode or the synchronisation mode is selected for the corresponding group of $N_{in}$ input frames.

* * * * *